Sept. 20, 1966 W. FEINBLOOM 3,273,456
BIFOCAL LOUPES AND TELEMICROSCOPIC LENSES THEREFOR
Filed Dec. 7, 1962 3 Sheets-Sheet 1
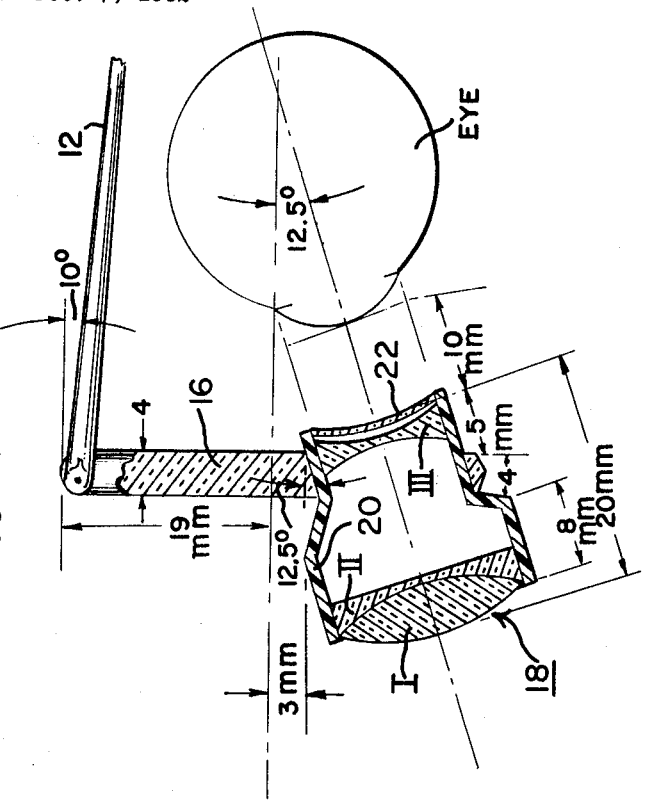
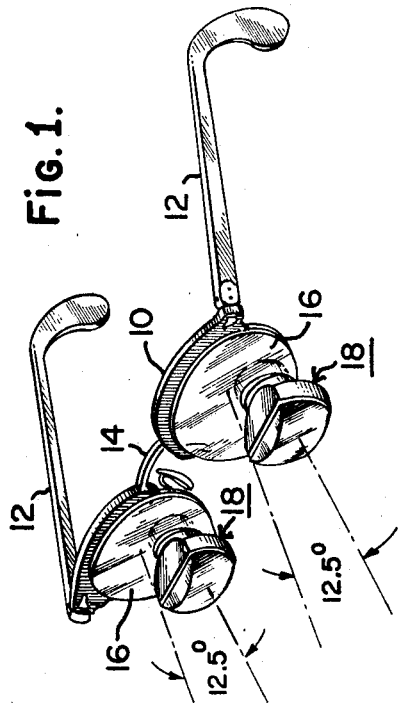
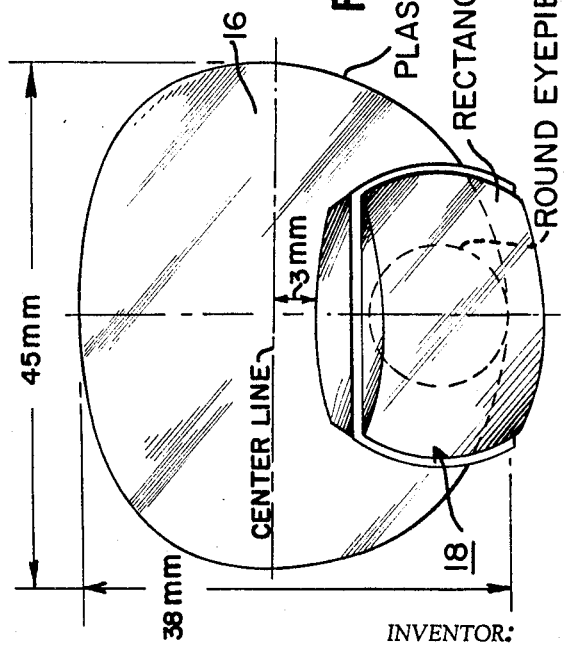
INVENTOR:
WILLIAM FEINBLOOM
BY Charles H. Brown
ATTORNEY INVENTOR:
WILLIAM FEINBLOOM
BY Charles H. Brown
ATTORNEY Sept. 20, 1966  W. FEINBLOOM  3,273,456
BIFOCAL LOUPES AND TELEMICROSCOPIC LENSES THEREFOR
Filed Dec. 7, 1962  3 Sheets-Sheet 3

Fig. 7.

| WORKING DISTANCE | | 20" | 13" | 10" | 8" |
|---|---|---|---|---|---|
| MAGNIFICATION (APPROX) | | 2.0X | 2.0X | 2.0X | 2.0X |
| OBJ. CROWN LENS I | $n_1$ | 1.620 | 1.620 | 1.620 | 1.620 |
| | $V_1$ | 60.3 | 60.3 | 60.3 | 60.3 |
| | $R_1$ | +19.0 | +19.0 | +19.0 | +19.0 |
| | $R_2$ | −36.0 | −36.0 | −36.0 | −36.0 |
| | $d_1$ | 7.8 | 7.8 | 7.8 | 7.8 |
| | $D_1$ | 15.0X23.0 | 15.0X23.0 | 15.0X23.0 | 15.0X23.0 |
| OBJ. FLINT LENS II | $n_2$ | 1.649 | 1.649 | 1.649 | 1.649 |
| | $V_2$ | 33.8 | 33.8 | 33.8 | 33.8 |
| | $R_3$ | −36.0 | −36.0 | −36.0 | −36.0 |
| | $R_4$ | +439.4 | ∞ | −486.1 | −239.1 |
| | $d_2$ | 0.8 | 0.8 | 0.8 | 0.8 |
| | $D_2$ | 15.0X23.0 | 15.0X23.0 | 15.0X23.0 | 15.0X23.0 |
| | $d_3$ | 11.3 | 11.3 | 11.3 | 11.3 |
| FLINT EYEPIECE LENS III | $n_3$ | 1.605 | 1.605 | 1.605 | 1.605 |
| | $V_3$ | 43.6 | 43.6 | 43.6 | 43.6 |
| | $R_5$ | −16.7 | −18.0 | −14.3 | −14.3 |
| | $R_6$ | +29.9 | +26.4 | +42.7 | +42.7 |
| | $d_4$ | 0.8 | 0.8 | 0.8 | 0.8 |
| | $D_3$ | 12.0 | 12.0 | 12.0 | 12.0 |

$n$ - IS THE INDEX OF REFRACTION OF THE LENS
$V$ - IS THE DISPERSIVE VALUE OR POWER OF THE GLASS

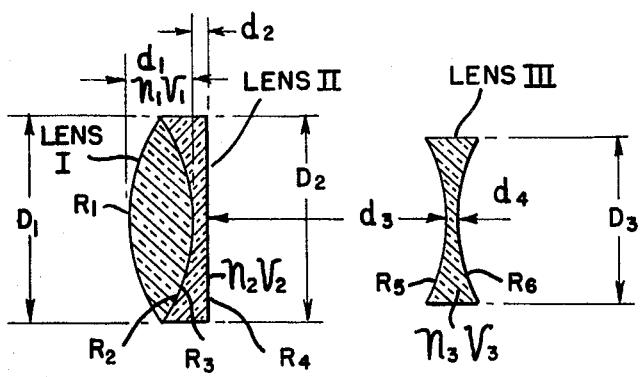

Fig. 6.

INVENTOR.
WILLIAM FEINBLOOM
BY Charles H. Brown
ATTORNEY

United States Patent Office 3,273,456
Patented Sept. 20, 1966

3,273,456
BIFOCAL LOUPES AND TELEMICROSCOPIC LENSES THEREFOR
William Feinbloom, 105 E. 35th St., New York, N.Y.
Filed Dec. 7, 1962, Ser. No. 243,048
6 Claims. (Cl. 88—57)

This invention relates to improvements in bifocal loupes, sometimes referred to as bifocal binoculars, and to a novel telemicroscopic lens therefor.

Bifocal loupes are useful where magnified, sharp, critical, prolonged and comfortable vision is required, as for example in surgery, dental work, dermatological work and in the assembly of miniature parts.

It has been proposed in the past to obtain an increase in normal vision above that obtained with ordinary regular spectacle corrections by the additional use of a single magnifying loupe or by the use of a binocular magnifying loupe. Both of these known loupes have disadvantages. The single magnifying loupe, such as a jeweler's monocular loupe, has the obvious disadvantage of not providing binocular vision and also producing fatigue and significant disturbances in binocular vision if used over long periods of time. Known binocular loupes are of two types: first, the simple magnifying lenses with some prism incorporated to allow for the change in the convergence angle required of the eyes when the image is magnified and projected at some further distance; and second, a multiple lens configuration designed to be used as adjuncts to or over or in front of a regular pair of prescription glasses. Neither one of these known binocular loupes is a true bifocal loupe. Furthermore, in the first type of known binocular loupe, the resulting working distance is too short with desirable magnifications and the magnified field is too small in diameter. In the second type of known binocular loupe, the field of vision is too small because of the increased distance of the eye piece of the multiple lens system from the eye of the person wearing the loupe. Other disadvantages of both types of loupes are that they are bulky, they do not allow for full mobility on the part of the user, and they cannot be worn comfortably and continuously for many hours of the working day.

The present invention overcomes the foregoing disadvantages and represents improvements over known binocular loupes in many ways some of which are: (1) The binocular loupe of the invention is a true bifocal loupe with the bifocal parts being "binoculars." The true bifocal form with the carrier lens containing the regular prescription and the segment containing the magnifying binocular system allows for full mobility on the part of the user, and can be worn comforably for most of the working day in regular glass frames. (2) The bifocal loupe is specially "declinated" in its position in the carrier lens so that posture involving the position of the back, the neck, head and eyes normally assumed while working at close distances is maintained through the glasses. Thus the distant vision upper part is properly angled for distant vision, about 10° to the distant line of sight, or to the temples of the frame, and the bifocal part separately angled or declined for close vision by an additional 12½° in most cases. (3) The spectacle correction lens is made small as the eyepiece and inserted behind it in the same mounting. This enables the correction lens to be made much thinner than a regular spectacle lens and so allows the entire binocular unit to fit closer to the entrance pupil of the eye. This distance between the entrance pupil of the eye and the binocular unit can be kept as small as 10 mm. (the distance of the length of the eyelashes), whereas in other loupes the binocular part is from 15 to 20 mm. or more away from the eye, depending on the prescription. This difference between 10 mm. achieved by the present invention and the other longer distances makes a significant difference both in the brightness of the field seen, and in the width of the field seen. By having the correction lens so close to the eye piece, there is obtained a reduction in interference from side reflections, and so a reduction in loss of contrast. (4) The optical design itself is newly developed to yield at its given magnification a well corrected and a larger useful field of vision; and (5) The optical design for the magnification and field is highly compact (more so than the magnifying units used on known types of binocular loupes), and so less bulky and more acceptable cosmetically.

A feature of the present invention is the rectangular objective (approximately 15 mm. by 23.0 mm.) while the eyepiece is circular (approximately 12 mm. diameter). In this form of rectangular objective, more light is allowed to enter the system and more horizontal field of vision is obtained. At the same time, and this is important, the bifocal line is kept well below (3 mm. below) the central optic axis of the upper carrier lens. In this way, the bifocal part where the objective protrudes about one-half (½) inch forward of the carrier is always below the line of sight when looking through the upper carrier.

Another feature of the invention lies in the arrangement wherein part of the binocular bifocal (the eyepiece) is mounted behind the carrier lens (that is, between the eye of the wearer and the plane of the carrier lens) and part (the objective) is mounted in front of the carrier lens. This construction produces three advantages, namely: (1) The eyepiece is placed closer to the pupil of the eye and so gives more field of view and better optical images. It should be understood that the carrier lens itself, containing the distance correction, is limited in how close it can be made to approach the eye. It is limited by the bridge of the nose, the frame and the orbital opening. No matter how close the carrier lens can be brought to the eye, the bifocal unit of the invention can be brought still closer to the eye because the bifocal unit pierces the carrier, and the eyepiece extends backwards through it. (2) The unit looks better cosmetically since less of the unit protrudes forward, and so is more readily accepted cosmetically; and (3) There is a reduction in leverage of the weight of the bifocal unit. By mounting it back in the manner described, instead of mounting it in front of the carrier, the torque on the glasses is reduced as they rest on the nose. This torque tends to rotate the glasses off the ears of the wearer, and the weight extended farther out from the carrier lens makes the glasses feel much heavier and less comfortable.

Still another feature of the invention is the telemicroscopic lens system or short focus telescope which, by virtue of its design, requires a minimum of changes in the parameters to obtain a change in working distance ranging from, let us say, 8 inches to 20 inches, by way of example. The novel design for the telemicroscopic lens system forms the basis of a family or series of telemicroscopes focusing at different distances, wherein certain radii of the lenses in the objective are always the same and the distance between the objective and the eyepiece is kept constant.

A more detailed description of the invention follows in conjunction with drawings, wherein:

FIGURE 1 is a perspective view showing the bifocal loupe spectacles of the invention;

FIGURE 2 is a vertical sectional view taken through one of the telemicroscopic lenses and its associated carrier of FIGURE 1, and also shows the position of the eye of the wearer of the spectacles when looking through the telemicroscopic lens. The dimensions given in FIGURE 2 are in millimeters;

FIGURE 3 is an enlarged front view of a carrier lens and its bifocal telemicroscopic lens and shows the rectangular-shaped objective positioned below the center line and central optic axis of the carrier lens;

Figure 5:
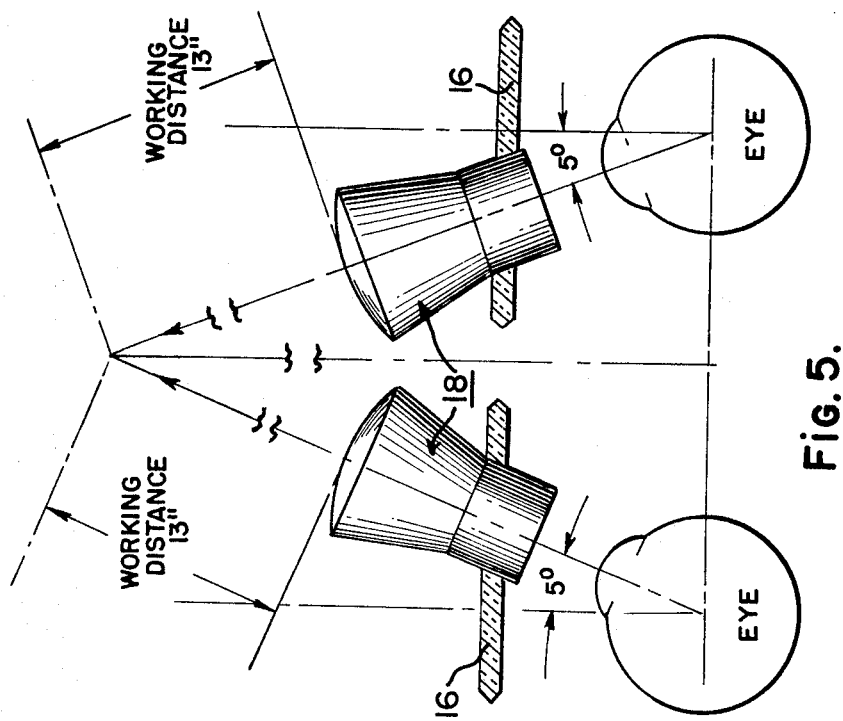
Figure 4:
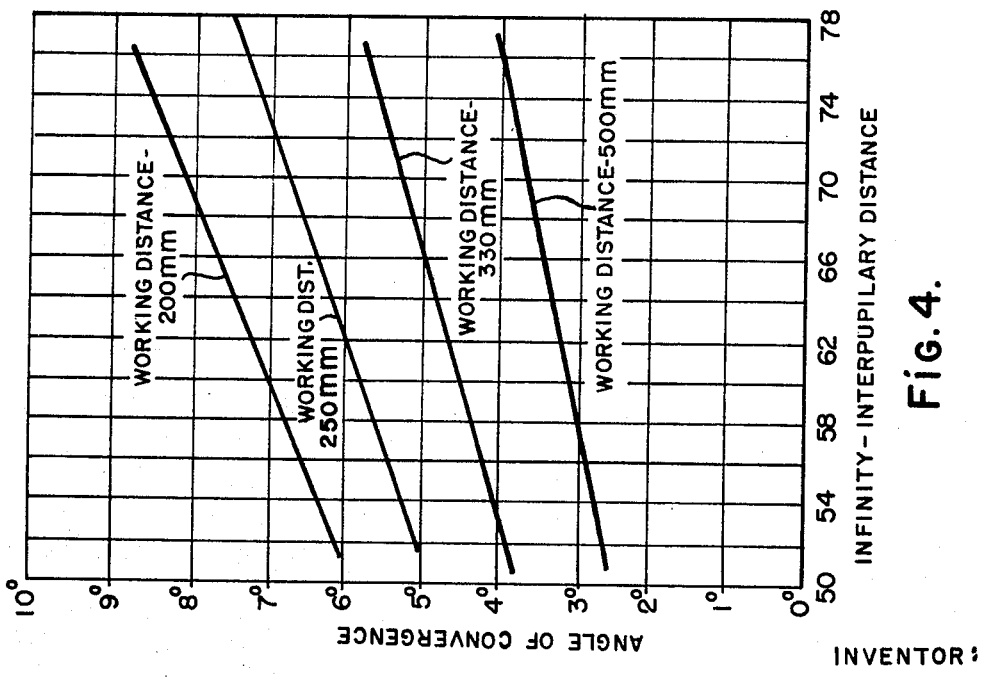

FIGURE 4 graphically charts the interpupillary distance versus angle of convergence of the pair of telemicroscopic lenses of the bifocal loupe of the invention for different working (focusing) distances;

FIGURE 5 is a horizontal sectional view taken immediately above the pair of telemicroscopic lenses as they are mounted in their respective carrier lenses and shows the convergence of the magnifying optical systems for an illustrative working distance of 13 inches. The eyes of the wearer are shown to indicate a 5° convergence angle for the pupils;

FIGURE 6 is a vertical section of the telemicroscopic optical lens system of the invention; and FIGURE 7 is a table or chart of parameters for the different lenses of the telemicroscopic lens system of the invention for different working or focusing distances, and forms the basis of a family or series of telemicroscopes.

Throughout the figures of the drawings the same parts are identified by the same reference numerals.

In the drawings, there is shown a spectacle frame or mount 10 having temple pieces 12 and an intermediate nose bridge 14, suporting carrier lenses 16, 16 in each of which there is a bifocal unit in the form of a telemicroscopic lens system 18. The carrier lens 16 may be made out of clear transparent plastic of glass ground to a particular prescription for distant vision, or may even be a plain lens without any visual corrective features. The telemicroscopic magnifying lens system 18 is mounted in the carrier lens 16 about 3 mm. below the central optic axis of the upper carrier lens and protrudes forward of the carrier lens about one-half inch and is always below the line of sight when looking through the upper carrier 16. Lens system 18 comprises an objective double convex crown lens I cemented to an objective concave flint lens II, to form a cemented objective doublet. This doublet is spaced a fixed distance by air from the double concave flint eyepiece lens III. All three lenses of the magnifying lens system 18 are mounted within a moulded plastic binocular mounting 20 which on its exterior surface is translucent or substantially opaque due to the rough unpolished surface of the mounting. If desired, the interior or exterior surface of the mounting may be painted black, although this is not preferred due to the psychological effect on the wearer. This mounting is moulded to insure proper alignment of the lenses contained therein as well as proper convergence and declination. Mounting 20 pierces the carrier lens 16 so that the eyepiece is closer to the entrance pupil of the eye than the carrier lens 18. This distance can be kept as small as 10 mm. which is about the distance of the length of the eyelashes; thus achieving a wider field of vision while permitting more light to enter the eye through the lens system. A correction lens 22 is supported in mounting 20 very close to the eyepiece thereby reducing interference from side reflections and loss of contrast. This correction lens 22 is incorporated within the tube or mounting of the telemicroscope and provides an individual prescription for the wearer.

The objective and mounting therefor which protrudes forward of the carrier lens 16 are made to be rectangular in order to reduce the vertical dimension and keep the top thereof 3 mm. below the line of sight for distant vision, looking straight ahead through the carrier lens. The longer horizontal dimension of the rectangular construction enables more light to reach the eye through the objective, as distinguished from a circular or round objective and mounting therefor. By way of example, the rectangular objective may be approximately 15 mm. x 23 mm. The eyepiece lens III is circular and approximately 12.0 mm. in diameter. The bifocal binocular loupe of the present invention is specially "declinated" in its position in the carrier so that the posture of the wearer normally assumed while working at a close distance is maintained while viewing through the lens 18. Telemicroscopic lens 18 is "declinated" 12½° while the carrier lens 16 is angled at 10° to the temple of the frame or to the distant line sight, thereby making a total of 22½° for both carrier lens and the bifocal magnifying optical lens system 18. The effective telescopic declination angle is about 45° to the vertical or horizontal by including the generally normal 22½° inclination of the head of the wearer and his eyes downward for normal close vision, though this 45° angle may vary depending upon the occupation or work of the wearer of the bifocal loupes.

The telemicroscopic lens systems 18, 18 in both carrier lenses converge so as to focus at the desired working distance, as shown in more detail in FIGURE 5. In the present invention, the convergence angle is determined by the interpupillary distance (P.D.) and the working distance as shown in the curves of FIGURE 4. This convergence angle should be changed for every millimeter change in P.D. (interpupillary distance). The convergence angle may have to be changed further by small parts of a degree because of certain tendencies on the part of the eyes of the wearers to diverge or converge differently from normal. These minor adjustments can easily be carried out by the optician making use of the bifocal loupes of the invention with ordinary optical pliers by converging the plane of the lenses inward or outward a small part of a degree. Thus, it was found practical for loupes of working distance 330 mm. (13 inches) and where the infinity interpupillary distance varies from 62 to 66 (the most common P.D. for men), to make them all 5° convergence (note FIGURE 5). Each pair, of course, is made at the proper P.D. by properly displacing the hole in the plastic carrier. This type of adjustment is very important to take care of the convergence requirements of certain persons, when they vary from the expected normal.

By means of the present invention, it is possible to place each individual segment binocular at the precise distance on center, above or below the optic or mechanical center of the carrier lens. This is especially important where one eye or orbit is higher in the head than the other.

In measuring the wearer of these bifocal binoculars, it is possible for the optometrist, ophthalmologist or optician to determine the vertical position or height with respect to the center required, and the binocular units can so be placed in that position. Also this height may have to be varied depending on the individual features and nature of work done.

Similarly there are some persons whose eyes are not symmetrical with respect to their median line. Thus, the right eye may be 30 mm. from the center of the bridge of the nose, and the left eye 34 mm. from the bridge center. This would require decentering the right binocular unit inward less than the left.

The present invention is designed to allow the practitioner who fits these loupes to do so most economically in case of small P.D. changes required. By designing them to fit in standard frames, the practitioner can remove the lenses from one standard frame of P.D., say 64 mm., and re-insert them in a frame of 62 mm. P.D. or 64 mm. P.D. Sometimes this is necessary in spite of the apparent correctness of the original measurement of the distant or infinity P.D. In the first place, an error may have been made in this measurement because of the patient's inability to keep the eyes perfectly still. Again, in some eyes it is not possible to know where the visual axis or lines of sight pass through the pupil. In the P.D. measurements in most cases, it is assumed they pass through the center of the pupils. It is common knowledge in the field, that such is rarely the case. While the difference is generally small, occasionally this can be large enough to cause an error. By standardizing the lens forms as to convergence angle and declination angle, and mounting them in standard frames; the bifocal loupes or binoculars of the present invention can easily be transferred to change only the P.D. by changing the frame.

The details of the novel telemicroscopic optical lens system of the invention are shown in FIGURE 6 and the manner of producing a family or series, as well as an individual one, is easily achieved by following the parameters of the table of FIGURE 7. It should be observed from an inspection of the table or chart of FIGURE 7 that for each lens, for all working or focusing distances of 8 inches to 20 inches, the indexes of refraction $n$ and the dispersive values $v$ are identical. The surfaces $R_1$, $R_2$ and $R_3$ are always the same in the objective. Surface $R_4$, however, is changed to give the proper working distance. The distance $d_3$ between the objective and the eyepiece lens III is kept constant at 11.35 mm., as a result of which the overall telemicroscopic lens system can be maintained compact and used in the same mounting. The carrier of the eyepiece should be changed to balance the aberrations of spherical, coma and astigmatism of oblique bundles, while the color is corrected by the choice of the value of the glasses. Hence, by changing solely the last radius $R_4$ and keeping the power of the eye piece constant, but where the radii are varied to best correct the aberrations in the objective used, I have developed a series of optical systems of similar axial length but of different working or focusing distances. All telemicroscopic lenses of the series have the same total axial length, the objectives have the same optical constants except for the rear surface of the concave flint which faces the eyepiece, and the eyepieces have the same optical constants and refractive power except for the radii. The data in the chart of FIGURE 7 is illustrative and examples of a magnifying optical system having a greater range of working distances, for example, from 40 inches down to 6 inches.

The invention is also applicable to a near vision binocular loupe where the carrier lens is a half-eye or semicircular; that is, a bifocal pair of spectacles without the upper half of the bifocal carrier.

What is claimed is:

1. A telemicroscopic lens comprising an objective composed of a double convex crown having a thickness $d_1$ cemented to a concave flint having a minimum thickness $d_2$ and spaced from said objective by a fixed airspace distance $d_3$, a double concave eyepiece having a minimum thickness $d_4$, said double convex crown having an outer radius $R_1$ and an inner radius $R_2$, said concave flint having an inner radius $R_3$ and an outer radius $R_4$, said eyepiece having radii $R_5$ and $R_6$, the indices of refraction and the dispersive values of the double convex crown, the concave flint and the eyepiece being respectively $n_1$, $v_1$, $n_2$, $v_2$, $n_3$, $v_3$, said radii, indices, dispersive values, thicknesses and airspace distance being substantially as set forth as follows:

| | |
|---|---|
| $n_1$ | 1.620 |
| $v_1$ | 60.3 |
| $R_1$ | +19.0 |
| $R_2$ | −36.0 |
| $d_1$ | 7.8 |
| $n_2$ | 1.649 |
| $v_2$ | 33.8 |
| $R_3$ | −36.0 |
| $R_4$ | +439.4 |
| $d_2$ | 0.8 |
| $n_3$ | 1.605 |
| $v_3$ | 43.6 |
| $R_5$ | −16.7 |
| $R_6$ | +29.9 |
| $d_3$ | 11.3 |
| $d_4$ | 0.8 |

2. A telemicroscopic lens comprising an objective composed of a double convex crown having a thickness $d_1$ cemented to a concave flint having a minimum thickness $d_2$ and spaced from said objective by a fixed airspace distance $d_3$, a double concave eyepiece having a minimum thickness $d_4$, said double convex crown having an outer radius $R_1$ and an inner radius $R_2$, said concave flint having an inner radius $R_3$ and an outer radius $R_4$, said eyepiece having radii $R_5$ and $R_6$, the indices of refraction and the dispersive values of the double convex crown, the concave flint and the eyepiece being respectively $n_1$, $v_1$, $n_2$, $v_2$, $n_3$, $v_3$, said radii, indices, dispersive values, thicknesses and airspace distance being substantially as set forth as follows:

| | |
|---|---|
| $n_1$ | 1.620 |
| $v_1$ | 60.3 |
| $d_1$ | 7.8 |
| $R_1$ | +19.0 |
| $R_2$ | −36.0 |
| $n_2$ | 1.649 |
| $v_2$ | 33.8 |
| $d_2$ | 0.8 |
| $R_3$ | −36.0 |
| $R_4$ | ∞ |
| $n_3$ | 1.605 |
| $v_3$ | 43.6 |
| $d_3$ | 11.3 |
| $R_5$ | −18.0 |
| $R_6$ | +26.4 |
| $d_4$ | 0.8 |

3. A telemicroscopic lens comprising an objective composed of a double convex crown having a thickness $d_1$ cemented to a concave flint having a minimum thickness $d_2$ and spaced from said objective by a fixed airspace distance $d_3$, a double concave eyepiece having a minimum thickness $d_4$, said double convex crown having an outer radius $R_1$ and an inner radius $R_2$, said concave flint having an inner radius $R_3$ and an outer radius $R_4$, said eyepiece having radii $R_5$ and $R_6$, the indices of refraction and the dispersive values of the double convex crown, the concave flint and the eyepiece being respectively $n_1$, $v_1$, $n_2$, $v_2$, $n_3$, $v_3$, said radii, indices, dispersive values, thicknesses and airspace distance being substantially as set forth as follows:

| | |
|---|---|
| $n_1$ | 1.620 |
| $v_1$ | 60.3 |
| $R_1$ | +19.0 |
| $R_2$ | −36.0 |
| $d_1$ | 7.8 |
| $n_2$ | 1.649 |
| $v_2$ | 33.8 |
| $R_3$ | −36.0 |
| $R_4$ | −486.1 |
| $d_2$ | 0.8 |
| $n_3$ | 1.605 |
| $v_3$ | 43.6 |
| $R_5$ | −14.3 |
| $R_6$ | +42.7 |
| $d_3$ | 11.3 |
| $d_4$ | 0.8 |

4. A telemicroscopic lens comprising an objective composed of a double convex crown having a thickness $d_1$ cemented to a concave flint having a minimum thickness $d_2$ and spaced from said objective by a fixed airspace distance $d_3$, a double concave eyepiece having a minimum thickness $d_4$, said double convex crown having an outer radius $R_1$ and an inner radius $R_2$, said concave flint having an inner radius $R_3$ and an outer radius $R_4$, said eyepiece having radii $R_5$ and $R_6$, the indices of refraction and the dispersive values of the double convex crown, the concave flint and the eyepiece being respectively $n_1$, $v_1$, $n_2$, $v_2$, $n_3$, $v_3$, said radii, indices, dispersive values, thicknesses and airspace distance being substantially as set forth as follows:

| | |
|---|---:|
| $n_1$ | 1.620 |
| $v_1$ | 60.3 |
| $R_1$ | +19.0 |
| $R_2$ | −36.0 |
| $d_1$ | 7.8 |
| $n_2$ | 1.649 |
| $v_2$ | 33.8 |
| $R_3$ | −36.0 |
| $R_4$ | −239.1 |
| $d_2$ | 0.8 |
| $n_3$ | 1.605 |
| $v_3$ | 43.6 |
| $R_5$ | −14.3 |
| $R_6$ | +42.7 |
| $d_3$ | 11.3 |
| $d_4$ | 0.8 |

5. A telemicroscopic lens comprising an objective composed of a double convex crown having a thickness $d_1$ cemented to a concave flint having a minimum thickness $d_2$ and spaced from said objective by a fixed airspace distance $d_3$, a double concave eyepiece having a minimum thickness $d_4$, said double convex crown having an outer radius $R_1$ and an inner radius $R_2$, said concave flint having an inner radius $R_3$ and an outer radius $R_4$, said eyepiece having radii $R_5$ and $R_6$, the indices of refraction and the dispersive values of the double convex crown, the concave flint and the eyepiece being respectively $n_1$, $v_1$, $n_2$, $v_2$, $n_3$, $v_3$, said radii, indices, dispersive values, thicknesses and airspace distance being substantially as set forth as follows:

| | |
|---|---:|
| $n_1$ | 1.620 |
| $v_1$ | 60.3 |
| $R_1$ | +19.0 |
| $R_2$ | −36.0 |
| $d_1$ | 7.8 |
| $n_2$ | 1.649 |
| $v_2$ | 33.8 |
| $R_3$ | −36.0 |
| $d_2$ | 0.8 |
| $n_3$ | 1.605 |
| $v_3$ | 43.6 |
| $d_3$ | 11.3 |
| $d_4$ | 0.8 | the value of $R_4$ being chosen for a required close working distance, while the values of $R_5$ and $R_6$ are chosen to reduce the optical aberrations of spherical, coma and astigmatism of oblique bundles and so obtain the best possible optical image.

6. A telemicroscopic bifocal system having a pair of telemicroscopic lenses as defined in claim 5, a mounting supporting a pair of distance vision carrier lenses each having inserted therein one of said telemicroscopic lenses, said telemicroscopic lenses converging to focus at a close finite distance.

References Cited by the Examiner

UNITED STATES PATENTS

| | | | |
|---|---|---|---|
| 1,000,346 | 8/1911 | VonRohr | 88—57 |
| 2,256,026 | 9/1941 | Husar | 88—57 |
| 2,698,555 | 1/1955 | McCarthy | 88—57 |
| 2,728,266 | 12/1955 | Tolle | 88—57 |
| 2,935,910 | 5/1960 | Schmidt | 88—39 |
| 3,014,405 | 12/1961 | Swikart | 88—39 |
| 3,152,212 | 10/1964 | Altman et al. | 88—57 |

FOREIGN PATENTS 1,199,622  6/1959  France.

OTHER REFERENCES

Kollmorgen Optical Corporation: "Spectel" Aids to Sub-Normal Vision, Bulletin No. 301 (Bulletin received in Patent Office Sept. 20, 1955).

JEWELL H. PEDERSEN, *Primary Examiner.*

JOHN K. CORBIN, *Examiner.*

L. ORLOFF, *Assistant Examiner.*